United States Patent [19]

Saitou et al.

[11] 4,309,002
[45] Jan. 5, 1982

[54] MECHANISM FOR PREVENTING LOOSENING OF MAGNETIC RECORDING TAPE OF TAPE CASSETTE

[75] Inventors: Sinichi Saitou; Toshikazu Kato; Seizo Watanabe, all of Hachioji; Toyoo Nishiyama, Musashimurayama; Misao Shimoda, Hamura; Tutomu Shibata, Hachioji; Kenji Kimura, Tachikawa; Ken Satoh, Akikawa, all of Japan

[73] Assignee: Olympus Optical Co., Ltd., Tokyo, Japan

[21] Appl. No.: 137,466

[22] Filed: Apr. 4, 1980

[30] Foreign Application Priority Data

Apr. 10, 1979 [JP] Japan .......................... 54/47065[U]

[51] Int. Cl.³ .......................... G03B 1/04; G11B 15/32
[52] U.S. Cl. .................................................. 242/198
[58] Field of Search ............... 242/72, 197, 198, 199; 352/72, 78 R; 360/93, 96, 132

[56] References Cited

U.S. PATENT DOCUMENTS

| | | | |
|---|---|---|---|
| 2,676,766 | 4/1954 | Ross et al. | 242/76 |
| 3,706,426 | 12/1972 | Prahl | 242/198 |
| 3,807,840 | 4/1974 | Cook et al. | 352/72 |
| 3,894,796 | 7/1975 | Cook et al. | 352/72 |
| 3,900,170 | 8/1975 | Serizawa | 242/198 |

FOREIGN PATENT DOCUMENTS 52-18023  2/1977  Japan .

*Primary Examiner*—Leonard D. Christian
*Attorney, Agent, or Firm*—Frishauf, Holtz, Goodman and Woodward

[57] ABSTRACT

Within a housing of a tape cassette is mounted a reel hub serving to wind a magnetic recording tape. The reel hub is moved between a first position where one side edge of the tape wound around the reel hub is spaced from a wall of the housing and a second position where the one side edge of the tape abuts against the wall, reel hub being rotated at the first position by a reel shaft of a magnetic recordig tape running apparatus inserted through an opening of the wall of the tape cassette for engagement with the reel hub. Within the housing is also mounted a abutment member. The abutment member is movable between a third position where the abutment member is spaced from the other side edge of the tape wound around the reel hub located in the first position and a fourth position where the abutment member abuts against the other side edge of the tape wound around the reel hub located in the second position by the reel shaft inserted through the opening of the tape cassette housing for engagement with the reel hub. The abutment member is usually urged to the fourth position by a compression coil spring housed in the tape cassette housing.

9 Claims, 3 Drawing Figures

MECHANISM FOR PREVENTING LOOSENING OF MAGNETIC RECORDING TAPE OF TAPE CASSETTE

BACKGROUND OF THE INVENTION

This invention relates generally to a tape cassette comprising a housing, at least one reel hub rotatably mounted within the housing and a magnetic recording tape wound around the reel hub, and more particularly, to a mechanism for preventing the magnetic recording tape wound around the reel hub from loosening.

In a conventional tape cassette, the reel hub is freely rotatable within the housing of the tape cassette and is slightly movable in its axial direction except at the time when the tape cassette is mounted to a magnetic recording tape running apparatus by engagement of the reel hub with a reel shaft of the tape running apparatus. In other words, the reel hub is substantially freely movable during, for example, transportation of the tape cassette detached from the tape running apparatus. Thus, the magnetic recording tape wound around the reel hub is loosened in the radial direction of the reel hub. In addition, deviation between two adjacent turns of the tape takes place in the axial direction of the reel hub. The loosening mentioned above brings about a marked difference in diameter between two adjacent turns of the tape, leading to a marked fluctuation in the magnitude of back tension exerted on the magnetic recording tape when the tape is run by a running apparatus. Naturally, the tape fails to be run at a constant speed. Where the tape cassette is mounted to, for example, a tape recorder, the nonuniform running speed of the tape causes wow and flutter, resulting in unsatisfactory quality of the sound recorded on and reproduced from the magnetic recording tape. The deviation in the axial direction of the reel hub mentioned above also causes the sound reproduced from the tape to be unsatisfactory where the tape cassette is mounted to a tape recorder, because deviation occurs between the track of the magnetic recording tape and the magnetic head in the width direction of the tape.

SUMMARY OF THE INVENTION

An object of this invention is to provide a mechanism for preventing the loosening of a magnetic recording tape wound around the reel hub of a tape cassette, i.e., a mechanism which prevents the tape from being loosened in the radial direction of the reel hub and permits preventing two adjacent turns of the tape from being deviated in the axial direction of the reel hub even if the tape cassette detached from a running apparatus has been vibrated.

DETAILED DESCRIPTION OF THE PREFERRED EMBODIMENTS

Figure 1:
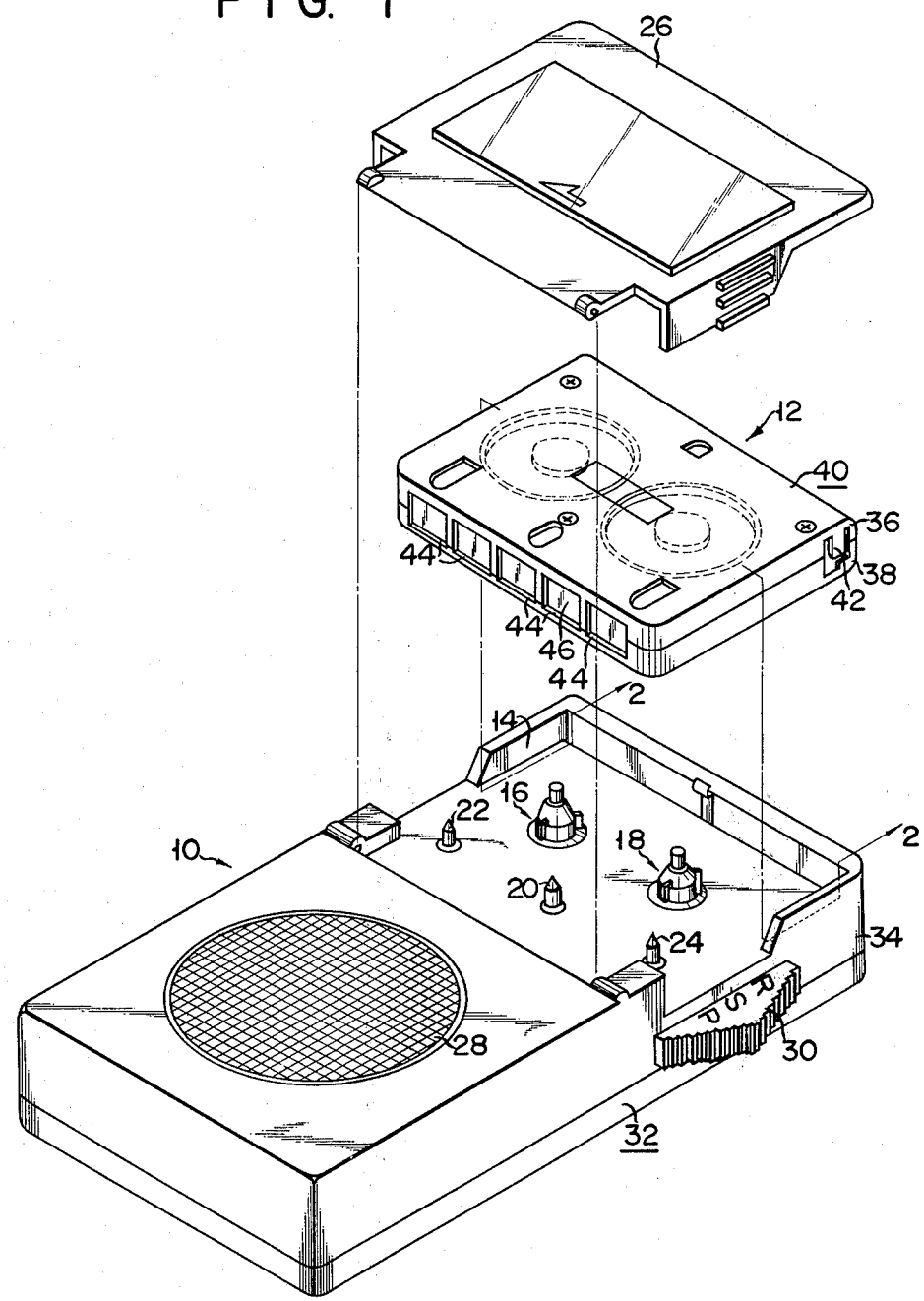
FIG. 1 is a perspective view showing an assembly of a tape cassette and an apparatus for running the magnetic recording tape housed in the tape cassette, said assembly comprising a mechanism according to one embodiment of this invention.

FIG. 1 shows a magnetic recording tape running apparatus, a tape recorder 10 in this embodiment, having a pair of reel shafts which constitutes one part of one embodiment of this invention, and also shows a tape cassette 12 having the other part of the embodiment. It is seen that the tape recorder 10 is provided with a recess 14 for receiving the tape cassette 12. Projecting upwardly within the recess 14 are a pair of reel shafts 16, 18, a capstan 20 and a pair of pins 22, 24 for defining the location of the tape cassette loaded in the recess 14. A lid 26 shown in FIG. 1 serves to prevent dust from entering the recess 14.

The tape recorder 10 comprises a housing 32, a loudspeaker 28 mounted on the housing 32 and a first mode selection switch 30 also mounted on the housing 32. Further, a rotation generating means (not shown), a D.C. motor in this embodiment, a pinch roller (not shown) and a magnetic head (not shown) are provided within the housing 32. The switch 30 serves to control the rotation of the D.C. motor and the location of the pinch roller and magnetic head so as to set the tape recorder 10 for a Play mode, Stop mode or Rewind mode. Incidentally, a second mode selection switch (not shown) serving to set the tape recorder for a Fast Forward mode, and a recording button (not shown) for setting the tape recorder for a Recording mode are provided in a manner to extend outward from a rear wall 34 of the housing 32. The reel shafts 16, 18 and the capstan 20 are rotated by the D.C. motor disposed within the housing 32 in accordance with the Play mode, Stop mode, Rewind mode, Recording mode and Fast Forward mode of the tape recorder 10.

As shown in FIG. 1, the tape cassette 12 comprises a housing 40 comprising of an upper half 36 and a lower half 38. A pair of removable lugs 42 for preventing accidental erasing of a sound recorded on the magnetic tape are provided at the rear ends of the left and right walls of the housing 40. Also, a plurality of openings 44 are formed in the front wall of the housing 40 such that a magnetic recording tape 46 loaded in the housing 40 is partly exposed to the outside. When the tape cassette 12 has been loaded in the recess 14 and the tape recorder 10 has been set for the Recording mode or Play mode, the magnetic head and the pinch roller are inserted into some of the openings 44 so as to contact the magnetic recording tape 46.

Figure 2:
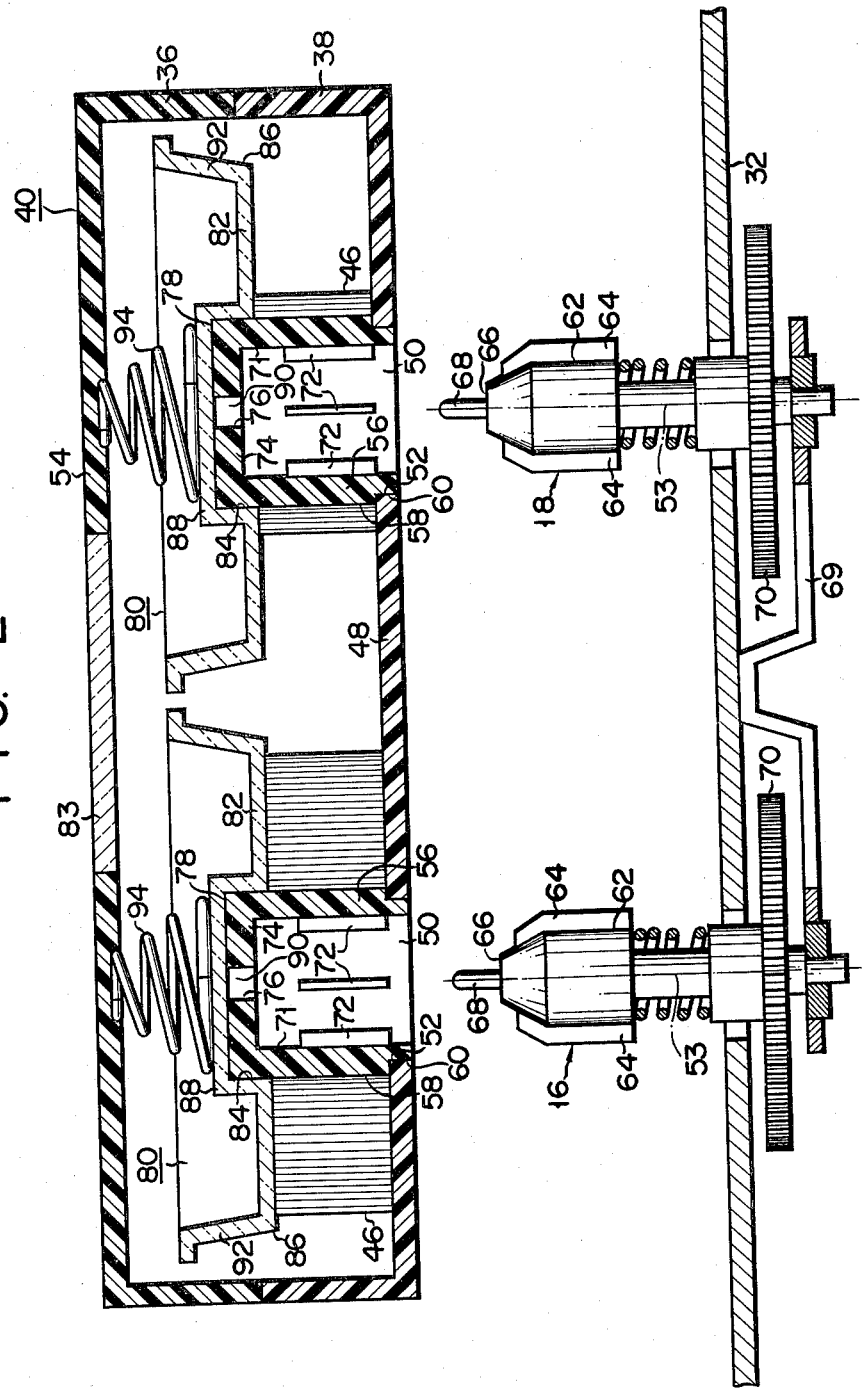
FIG. 2 is a schematic cross sectional view along the line 2—2 of FIG 1.

FIG. 2 shows that a pair of openings 50 are formed in a bottom wall 48 of the housing 40. When the tape cassette 12 has been loaded in the recess 14 of the tape recorder, the reel shafts 16, 18 are inserted into the openings 50. Each of the openings 50 is defined by a circular inner surface 52 concentric with an axis 53 of the reel shaft 16 or 18. As seen from the drawing, a pair of reel hubs 56 are provided in the free space between the bottom wall 48 and an upper wall 54 of the housing 40. The reel hub 56 comprises a circular first outer peripheral surface 58 larger in diameter than the opening 50 formed in the bottom wall 48 and a circular second outer peripheral surface 60 substantially equal in diameter to the opening 50. In other words, the outer peripheral surface of the reel hub 56 is stepped such that the lower end portion (second outer peripheral surface 60) is smaller in diameter than the remaining portion (first outer peripheral surface 58) as seen from the drawing. The first outer peripheral surface 58 has a height, or a length along the axis 53 of the reel shafts 16 or 18, greater than the width of the magnetic recording tape 46. Since one end of the tape 46 is fixed to the first outer peripheral surface 58, the tape 46 is wound around the first outer peripheral surface 58 when the reel hub 56 has been rotated. As seen from the drawing, one side edge of each turn of the tape 46 wound around the reel hub 56 abuts against the inner surface of the bottom wall 48 of the housing 40. On the other hand, the second outer peripheral surface 60 of the reel hub 56 is inserted into the opening 50, and can move in the direction along the axis 53 of the reel shafts 16 or 18 with a sliding contact with the inner surface 52.

Each of the reel shafts 16, 18 comprises an upper outer peripheral surface 62 located within the recess 14. Three engagement projections extending in the radial direction of the reel shaft are formed on the upper outer peripheral surface 62. In the embodiment shown in the drawings, the engagement projections are provided by three wings 64 formed on the outer surface 62. Those three wings 64 are equidistantly spaced from each other in the circumferential direction, and the base of each wing extends in the axial direction of the reel shaft. Incidentally, it suffices to provide at least one engagement projection 64 in this invention. Further, the projection 64 need not be of a wing shape as long as the projection extends in the radial direction of the reel shaft.

Each of the reel shafts 16, 18 also comprises an upper end surface 66 located in the recess 14. An upward projection 68 extending in the axial direction of the reel shaft is formed on the upper end surface 66 such that the axis of the projection 68 is concentric with the axis 53 of the reel shaft. Further, as shown in FIG. 2, the lower ends of the reel shafts 16, 18 are rotatably mounted to a chassis 69 disposed within the housing 32 of the tape recorder 10. Still further, a gear 70 for connection to the D.C. motor disposed within the tape recorder is mounted to the lower end of each of the reel shafts. Incidentally, it is possible to substitute a pulley for the gear 70.

Each of the reel hubs 56 comprises an inner peripheral surface 71 facing the outer peripheral surface 62 of the reel shaft. The inner peripheral surface 71 is concentric with the axis 53 of the reel shaft. As shown in FIG. 2, engagement projections radially extending toward the axis of the reel shaft are mounted to the inner peripheral surface 71 of the reel hub 56. In the embodiment shown in the drawings, the engagement projections mentioned comprise six wings 72 formed on the inner peripheral surface 71. Those six wings 72 are equidistantly separated from each other in the circumferential direction, and the base of each of the wings extends in the axial direction of the reel shaft. Incidentally, it suffices to provide at least one engagement projection 72 in this invention. Also, the engagement projection 72 is not necessarily of wing shape as long as the projection radially extends toward the axis of the reel shaft.

A flange 74 radially extending toward the axis of the reel shaft is formed on the upper end of the inner peripheral surface 71 of the each reel hubs 56. The flange 74 has an inner peripheral surface 76 serving to define a circular opening 90. The inner peripheral surface 76 is concentric with the axis 53 of the reel shaft 16 or 18 and the opening 90 has a diameter larger than the maximum diameter of the upward projection 68. Further, the thickness of the flange 74, or a length along the axis of the reel shaft is smaller than the axial length of the upward projection 68. As seen from FIG. 2, the upper surface of the flange 74 constitutes an upper end surface 78 of the reel hub 56. The vertical distance between the upper surface 78 and the other side edge of the magnetic recording tape 46 wound around the reel hub 56 is greater than the difference between the axial length of the upward projection 68 and the thickness of the flange 74.

The other side edge of each turn of the magnetic recording tape 46 wound around the reel hub 56 abuts against an abutment member 80. Specifically, the abutment member 80 comprises a disk-like body 82 disposed in a manner to have a common axis with the reel shaft, and the other side edge of the tape 46 is allowed to abut against the lower surface of the body 82. In the embodiment shown in the drawings, the body 82 is formed of a transparent plastic material and, thus, permits observing the amount of the tape 46 wound around the reel hub 56 through a window 83 formed in the upper wall 54 of the housing 40. The body 82 has a circular inner peripheral surface 84 substantially equal in diameter to the first outer peripheral surface 58 of the reel hub 56. The circular inner peripheral surface 84 is concentric with the axis 53 of the reel shaft. The body 82 is movable in the axial direction of the reel shaft and the first outer peripheral surface 58 of the reel hub is slidable along the inner surface 84 of the body 82. The body 82 also has a circular outer peripheral surface 86 having a diameter larger than that of the outermost turn of the magnetic recording tape 46 when the tape has been wound around either one alone of the two reel hubs 56. The abutment member 80 further comprises a step portion extending upwardly along the first outer peripheral surface 58 which is formed on the upper surface of the body 82 at an area adjacent to the inner peripheral surface 84. At an upper end of the step portion 88 is formed a covering portion which is a one element of the abutment member 80. The covering portion 88 radially extends along the upper end surface 78 towards the axis of the reel shaft. As shown in the drawing, a lower surface of the covering portion 88 covers the opening 90 defined by the inner peripheral surface 76 of the flange 74. On the upper surface of the body 82 at an area adjacent to the outer peripheral surface 86 is formed a ring-shaped rising portion 92 which is a one element of the abutment member 80. The rising portion 92 is concentric with the axis of the reel shaft and extends upwardly toward the upper wall 54 of the housing 40. The upper end surface of the rising portion 92 is located above a upper surface of the covering portion 88. All parts of the rising portion 92 have the same height, or the same length along the axis of the reel shaft between the upper surface of the body 82 and the upper end surface of the rising portion 92.

An urging means is provided between the upper surface of the covering portion 88 and an inner surface of the upper wall 54. In the embodiment shown in the drawings, the urging means is provided by a compression coil spring 94 located concentric with the axis of the reel shaft. As seen from FIG. 2, the upper end of the spring 94 abuts against inner surface of the upper wall 54 of the housing 40 with the lower end abutting against the upper surface of the covering portion 88 of the abutment member 80.

Figure 3:
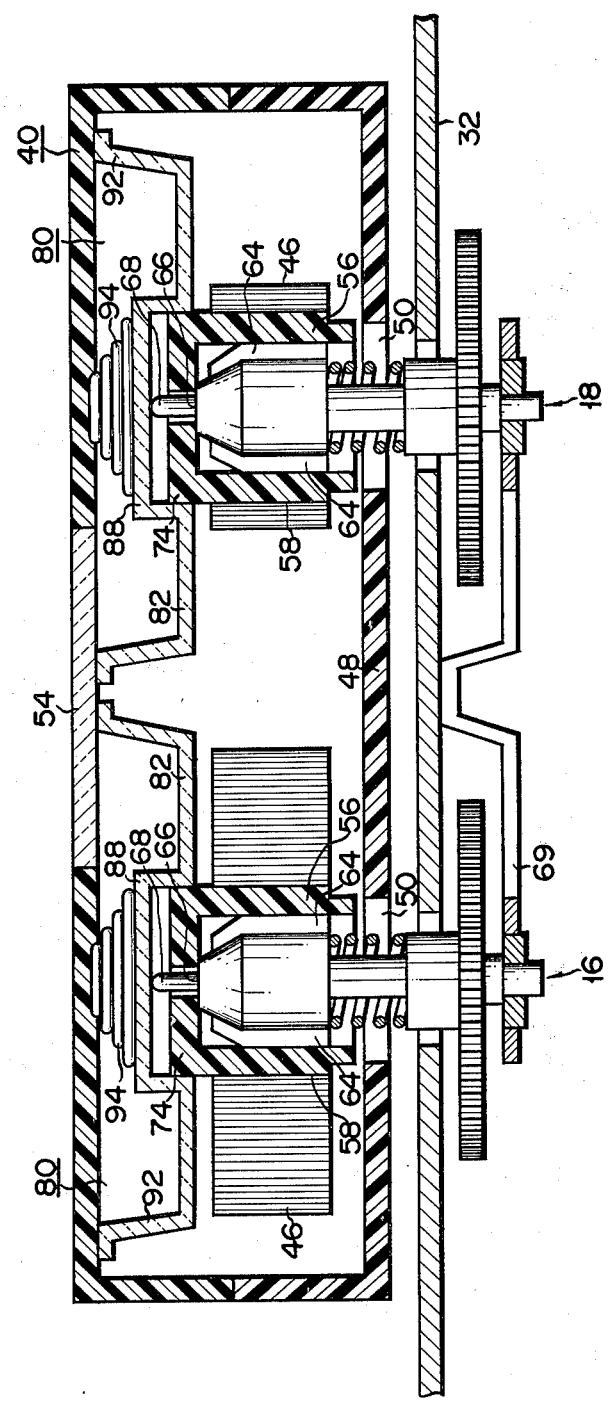
FIG. 3 is a cross sectional view schematically showing how the reel shaft of the tape running apparatus and the reel hub of the tape cassette, both shown in FIG. 2, are engaged with each other.

In operating the tape recorder-tape cassette assembly of the construction described above, the tape cassette 12 is loaded first in the recess 14 of the tape recorder 10. In this step, the upper portion of each of the reel shafts 16, 18 is inserted through the opening 50 formed in the bottom wall 48 of the housing 40 into the free space defined by the inner peripheral surface 71 of the reel hub 56. When the reel shaft has been inserted into said free space, the upper end surface 66 of the reel shaft abuts against the flange 74 of the reel hub 56. Thus, the each of the reel shafts 16 and 18 engages with the reel hub 56 in the direction along the axis 53 of the reel shaft. It should be noted that the upward projection 68 mounted on the reel shaft serves to push upward the covering portion 88 of the abutment member 80 against the urging force of the coil spring 94. As a result, the body 82 of the abutment member 80 is located in a third position where the other side edge of the magnetic recording tape 46 wound around the reel hub 56 is apart from the body 82. Naturally, the reel hub 56 is also pushed upward together with the abutment member 80 against the urging force of the coil spring 94, until the upper end surface of the rising portion 92 of the abutment member 80 abuts against the inner surface of the upper wall 54 of the housing 40. When the upper end surface of the rising portion 92 abuts against the upper wall 54, the reel hub 56 is located in a first position where the one side edge of the magnetic recording tape 46 wound around the reel hub is spaced apart from the inner surface of the bottom wall 48 of the housing 40 as shown in FIG. 3.

Suppose the first mode selection switch 30 shown in FIG. 1 has been set for, for example, the Play mode under the condition described above. In this case, the reel shaft 16 and the capstan 20 are rotated in the clockwise direction by the D.C. motor provided within the tape recorder. In accordance with rotation of the reel shaft 16, the wing 64 of the reel shaft 16 is engaged with the wing 72 of the reel hub 56 coupled with the reel shaft 16 so as to rotate the reel hub 56 in the clockwise direction. It should be noted that the reel hub 56 engaged with the reel shaft 18 is freely rotatable in this step. It follows that the magnetic recording tape 46 wound around the freely rotatable reel hub 56 is withdrawn and wound around the first outer peripheral surface 58 of the reel hub coupled with the reel shaft 16. As shown in FIG. 3, the first outer peripheral surface 58 of the reel hub coupled with the reel shaft 16 circumferentially slides along the circular inner surface 84 of the abutment member 80. Further, the upper end surface of the rising portion 92 of the abutment member 80 abuts against the upper wall 54 of the housing 40. It follows that the reel hub is allowed to make a stable rotation about the axis of the reel shaft 16 without eccentric rotation about the axis, rendering it possible to prevent two adjacent turns of the tape 46 wound around the reel hub 56 from being deviated from each other in the vertical direction.

When the tape cassette 12 is moved upward for disengagement from the recess 14 of the tape recorder 10, the reel hubs 56 are moved downward by the urging force of the coil spring 94, with the flanges 74 of the reel hubs kept in contact with the upper end surfaces 66 of the reel shafts 16, 18. The downward movement of the reel hub is stopped when the second outer peripheral surface 60 of the reel hub has been fully inserted into the opening 50 formed in the bottom wall 48 of the housing 40 such that the stepped surface between the first outer peripheral surface 58 and the second outer peripheral surface 60 of the reel hub has been brought into contact with the inner surface of the bottom wall of the housing 40. In this step, the reel hub 56 is located in a second position where the one side edge of the magnetic recording tape 46 wound around the reel hub abuts against the inner surface of the bottom wall 48 of the housing 40 as shown in FIG. 2. Then, the upper end surfaces 66 of the reel shafts 16, 18 are detached from the flanges 74 of the reel hubs, with the result that the abutment member 80 is moved downward by the urging force of the coil spring 94 in accordance with movement of the upper end surfaces 66 away from the flanges 74. The downward movement of the abutment member 80 is stopped when the covering portion 88 of the abutment member 80 has abutted against the upper end surface 78 of the reel hub 56 as shown in FIG. 2. In this step, the abutment member 80 is located in a fourth position where the lower surface of the body 82 of the abutment member 80 abuts against the other side edge of the magnetic recording tape 46 wound around the reel hub 56 as shown in FIG. 2.

As described above in detail, the magnetic recording tape 46 wound around the reel hub 56 is held between the inner surface of the bottom wall 48 of the housing 40 and the lower surface of the body 82 of the abutment member 80, when the tape cassette 12 has been removed from the recess 14 of the tape recorder 10. Thus, the tape 46 is not loosened in the radial direction of the reel hub even if the tape cassette 12 has been vibrated because friction exists between the one side edge of the tape 46 and the inner surface of the bottom wall 48 of the housing 40 and between the other side edge of the tape 46 and the lower surface of the body 82 of the abutment member 80. Further, the bottom wall 48 and the body 82 serve to prevent the tape 46 from moving in the axial direction of the reel hub. Thus, it is impossible for two adjacent turns of the tape 46 wound around the reel hub to be deviated from each other in the axial direction of the reel hub.

As described previously, the circular outer peripheral surface 86 of the body 82 has a diameter larger than that of the outermost turn of the tape 46 when the tape has been wound around either one alone of the two reel hubs 56. This permits the body 82 urged by the coil spring 94 to push uniformly the one side edge of the tape 46. It follows that no damage is done to the tape 46.

Needless to say, this invention is not restricted to the embodiment shown in the drawings. It is of course possible to provide various modifications within the technical scope of this invention. For example, the body 82 of the abutment member 80 may be rectangular, triangular, etc. as well as circular as viewed from above. Further, the coil spring 92 used as the urging means may be replaced by, for example, a leaf spring, or a sponge made of plastic material.

What we claim is:

1. A mechanism for preventing loosening of a magnetic recording tape in a tape cassette, comprising:
    a reel shaft having an axis, the reel shaft being rotatably mounted to a magnetic recording tape running apparatus equipped with means for rotating the reel shaft;
    a tape cassette housing having a wall which has an opening, the reel shaft extending through said opening when the tape cassette housing is mounted to the magnetic recording tape running apparatus;
    a magnetic recording tape loaded in the tape cassette housing;
    a reel hub rotatably mounted within the tape cassette housing and including means for engaging the reel shaft of the recording tape running apparatus, the reel hub serving to wind the magnetic recording tape, the reel hub being movable between a first position where one side edge of the magnetic recording tape wound around the reel hub is spaced from said wall of the tape cassette housing and a second position where the one side edge of the wound magnetic recording tape abuts against said wall of the tape cassette housing, and the reel hub being rotatable wherein said first position by the reel shaft inserted through said opening of said wall of the tape cassette housing and engaged with the reel hub;

an abutment member mounted within the tape cassette housing, and being movable between a third position where the abutment member is spaced from the other side edge of the magnetic recording tape wound around the reel hub located in the first position and a fourth position were the abutment member abuts against the other side of the magnetic recording tape wound around the reel hub located in the second position by the reel shaft inserted through said opening of said wall of the tape cassette housing; and urging means mounted within the tape cassette housing for urging the abutment member toward its fourth position.

2. The mechanism according to claim 1, wherein:
the reel shaft comprises an end portion insertable through the opening of the housing, the end portion having an end surface and an outer peripheral surface with at least one engagement projection extending in the radial direction of the reel shaft; and
the reel hub comprises an inner peripheral surface with at least one engagement projection engageable with the at least one engagement projection of the reel shaft in the circumferential direction of the reel hub, and a flange engageable with the end surface of the reel shaft in the axial direction of the reel shaft, the inner peripheral surface of the reel hub facing the outer peripheral surface of the end portion of the reel shaft.

3. The mechanism according to claim 2, wherein:
the reel hub comprises an end surface facing in the same direction as the end surface of the reel shaft;
the abutment member comprises a covering portion extending along the end surface of the reel hub; and
the reel shaft comprises a projection extending from the end surface thereof in the axial direction of the reel shaft, said projection projecting through the end surface of the reel hub when the end surface of the reel shaft is in contact with the flange of the reel hub so as to move the abutment member from the fourth position to the third position.

4. The mechanism according to claim 3, wherein:
the tape cassette housing comprises an inner surface facing said one side edge of the magnetic recording tape; and
the abutment member comprises a rising portion projecting in a direction from the fourth position to the third position, the rising portion abutting against said inner surface of the tape cassette housing when the abutment member is located in the third position.

5. The mechanism according to claim 4, wherein:
the reel hub comprises a circular outer peripheral surface located concentric with the axis of the reel shaft; and
the abutment member comprises a circular inner peripheral surface located concentric with the axis of the reel shaft, the circular inner peripheral surface of the abutment member being slidably in contact with the circular outer peripheral surface of the reel hub in the circumferential direction.

6. The mechanism according to claim 5, wherein the rising portion of the abutment member forms a ring concentric with the axis of the reel shaft.

7. The mechanism according to claim 6, wherein:
said opening of the tape cassette housing is defined by a circular inner peripheral surface of the housing, said circular inner peripheral surface being concentric with the axis of the reel shaft; and
the reel hub comprises a circular outer peripheral surface substantially equal in diameter to and slidable along the circular inner peripheral surface defining said opening of the tape cassette housing in the axial direction and about the axis of the reel shaft.

8. The mechanism according to any one of claims 4 to 7, wherein:
the tape cassette housing has a further inner surface facing the inner surface of said wall of the tape cassette housing;
the abutment member has a facing surface facing the further inner surface of the tape cassette housing; and
the urging means is disposed between the further inner surface of the housing and the facing surface of the abutment member and abuts against the further inner surface and the facing surface.

9. The mechanism according to claim 8, wherein the urging means comprises a compression coil spring mounted coaxial with the axis of the reel shaft.

* * * * *